(12) United States Patent
Cheng et al.

(10) Patent No.: US 10,895,881 B2
(45) Date of Patent: Jan. 19, 2021

(54) ADAPTIVE WATER LEVEL CONTROLS FOR WATER EMPTY OR FILL APPLICATIONS

(71) Applicant: FLUID HANDLING LLC., Morton Grove, IL (US)

(72) Inventors: Andrew A. Cheng, Wilmette, IL (US); Matt Ruffo, Geneva, NY (US); Jordan Ruff, Victor, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 301 days.

(21) Appl. No.: 15/927,296

(22) Filed: Mar. 21, 2018

(65) Prior Publication Data

US 2018/0299909 A1    Oct. 18, 2018

Related U.S. Application Data

(60) Provisional application No. 62/474,233, filed on Mar. 21, 2017.

(51) Int. Cl.
*F04D 15/00* (2006.01)
*G05D 7/06* (2006.01)
(Continued)

(52) U.S. Cl.
CPC ....... *G05D 7/0629* (2013.01); *F04D 15/0066* (2013.01); *F04D 15/0088* (2013.01);
(Continued)

(58) Field of Classification Search
CPC ..... F16K 15/14; F16K 15/148; B01D 29/112; B01D 29/56; B01D 35/153;
(Continued)

(56) References Cited

U.S. PATENT DOCUMENTS 4,303,406 A    12/1981 Ross
4,319,320 A    3/1982 Sato et al.
(Continued)

OTHER PUBLICATIONS

Vojtesek, J., et al, "Adaptive control of water level in real model of water tank," International Conference on Process Control, Jun. 9-12, 2015. http://ieeexplore.ieee.org/document/7169981/.
(Continued)

*Primary Examiner* — P. Macade Nichols
(74) *Attorney, Agent, or Firm* — Ware, Fressola, Maguire & Barber LLP (57) ABSTRACT

A pump controller has a signal processor that receives signaling about an instant water level $AI_L$ of a liquid in a container and generated by a water level transducer during an empty/fill application; and determines corresponding signaling to control a pump during the empty/fill application based upon the signaling received using a liquid level control algorithm that turns ON the pump when the instant water level $AI_L$ rises above a maximum empty water level during an empty application, or falls below a maximum fill water level during a fill application; turns OFF the pump when the instant water level $AI_L$ falls below a minimum empty water level for the empty application, or rises above a second maximum fill water level during the fill application; controls the pump when the instant water level $AI_L$ is in a liquid level region above the minimum empty water level and below a second maximum empty water level for the empty application, or falls below the second maximum fill water level and above a second minimum fill water level during the fill application based upon a respective desired adaptive pressure set point SP* being defined from a respective adaptive liquid level control curve with respect to the instant water level $AI_L$.

20 Claims, 3 Drawing Sheets

(51) Int. Cl.
*F04D 15/02* (2006.01)
*G01F 23/18* (2006.01)
*G05D 9/12* (2006.01)

(52) U.S. Cl.
CPC ....... *F04D 15/0209* (2013.01); *G01F 23/185* (2013.01); *G05D 9/12* (2013.01)

(58) Field of Classification Search
CPC .. B01D 2201/167; G05D 7/0629; G05D 9/01; F04D 15/0066; F04D 15/0088; F04D 15/0209; G01F 23/185
USPC ............ 141/83, 95, 121, 122, 126, 127, 198
See application file for complete search history.

(56) References Cited

U.S. PATENT DOCUMENTS

| | | | |
|---|---|---|---|
| 4,708,594 A | 11/1987 | Shinmei et al. | |
| 5,213,477 A | 5/1993 | Watanabe et al. | |
| 5,229,699 A | 7/1993 | Chu et al. | |
| 5,335,164 A | 8/1994 | Gough, Jr. et al. | |
| 5,669,095 A | 9/1997 | Dausch et al. | |
| 5,689,846 A | 11/1997 | Cheyne et al. | |
| 5,768,729 A | 6/1998 | Cracraft | |
| 6,577,908 B1 | 6/2003 | Wojsznis et al. | |
| 6,581,393 B2 | 6/2003 | Newman et al. | |
| 7,117,120 B2 | 10/2006 | Beck et al. | |
| 7,380,303 B2 | 6/2008 | Bellinetto et al. | |
| 7,925,385 B2 | 4/2011 | Stavale et al. | |
| 8,425,200 B2 | 4/2013 | Tran et al. | |
| 8,505,139 B2 | 8/2013 | Vanhazebrouck et al. | |
| 8,644,993 B1 | 2/2014 | Craft et al. | |
| 8,700,221 B2 | 4/2014 | Cheng et al. | |
| 9,451,868 B2 | 9/2016 | Ugel et al. | |
| 9,605,680 B2 | 3/2017 | Stiles, Jr. et al. | |
| 2003/0106582 A1 | 6/2003 | Jeong | |
| 2010/0162812 A1 | 7/2010 | Parkinson | |
| 2013/0105182 A1* | 5/2013 | McLoughlin | G05D 9/12 169/46 |
| 2014/0005841 A1 | 1/2014 | Cheng et al. | |
| 2015/0240801 A1 | 8/2015 | Marioni | |
| 2016/0281710 A1 | 9/2016 | Werner et al. | |

OTHER PUBLICATIONS

Mourad, E., et al, "Adaptive control of a water supply system," Control Engineering Practice, Mar. 2001, vol. 9, Issue 3, pp. 343-349. http://www.sciencedirect.com/science/article/pii/S0967066100001155.

Ravi, V.R., et al, "Application of Adaptive Control technique to interacting non linear systems," International Conference on Electronics Computer Technology, Apr. 8-10, 2011. http://ieeexplore.ieee.org/abstract/document/5941724/.

* cited by examiner

Fig. 1: Graph showing adaptive water level control curves for an empty application.

Fig. 2: Schematic flow chart for an empty application.

Fig. 3: Graph showing adaptive water level control curves for water a fill application.

Fig. 4: Schematic flow chart for water a fill application.

Apparatus 10, including a pump system,

A controller or pump controller C having a signal processor or signal processing module 10a configured at least to:

receive signaling containing information about an instant water level $AI_L$ of a liquid in a container and generated by a water level transducer during an empty or fill application; and determine corresponding signaling containing information to control a pump during the empty or fill application based upon the signaling received using a liquid level control algorithm that turns ON the pump when the instant water level $AI_L$ either rises above a maximum empty water level during an empty application, or falls below a maximum fill water level during a fill application, turns OFF the pump when the instant water level $AI_L$ either falls below a minimum empty water level for the empty application, or rises above a second maximum fill water level during the fill application, controls the pump when the instant water level $AI_L$ is either in a liquid level region above the minimum empty water level and below a second maximum empty water level for the empty application, or falls below the second maximum fill water level and above a second minimum fill water level during the fill application based upon a respective desired adaptive pressure set point SP* being defined from a respective adaptive liquid level control curve with respect to the instant water level $AI_L$, and controls the pump when the instant water level $AI_L$ is either in a second liquid level region above the second maximum empty water level and below the maximum empty water level for the empty application, or above the maximum fill liquid level and below the second minimum fill water level during the fill application, e.g., based upon the respective adaptive pressure set point SP* being a respective constant pressure set point.

Other signal processor circuits, circuitry, or components 10b that do not form part of the underlying invention, e.g., including input/output modules/modems, one or more memory modules (e.g., RAM, ROM, etc.), data, address and control busing architecture, etc.

| Pump 10c | Level transducer 10d | Pressure transducer 10e |

Figure 5

ADAPTIVE WATER LEVEL CONTROLS FOR WATER EMPTY OR FILL APPLICATIONS

CROSS-REFERENCE TO RELATED APPLICATION

This application claims benefit to provisional patent application Ser. No. 62/474,233, filed 21 Mar. 2017, which is hereby incorporated by reference in its entirety.

BACKGROUND OF THE INVENTION

1. Field of the Invention

The present invention relates to a technique for controlling a level of a liquid in a container, e.g., during liquid emptying and filling applications of the container.

2. Brief Description of Related Art

For most water level control applications including water empty and water fill, there may be only one or two constant pressure set points for a proportional, integral, derivative (PID) control function of pump speed. A constant pressure set point may result in a corresponding pump speed, which may make a constant flow rate or pressure even when the water level reaches its minimum (empty application) or its maximum (fill application) to sleep. However, one may expect to have a smooth transition of water flow rate and pressure when the water level reaches its limited value.

SUMMARY OF THE INVENTION

In earlier works by one or more of the present inventors, several adaptive pressure control concepts and techniques have been disclosed, e.g., including that set forth in references [1] thru [6] below. According to the inventors of the instant patent application, the concept of adaptive pressure control may be introduced into water level control as well consistent with that disclosed herein, e.g., to solve water pressure transition issues and problems in the art mentioned above. In other words, according to some embodiments of the present invention, water pressure as well as flow transition may be controlled in terms of any control curve shape, for instance, in effect so as to work the same as a mechanical type float switch water level control in a water tank.

In summary, the present invention sets forth a new and unique adaptive water level control for an empty application as well as for a fill application. An adaptive pressure set point with respect to an instant water level signal from a transducer is derived, so that water transition pressures from a normal to sleep mode may be as smooth and good, e.g., as one set up from a linear control curve to any power of curvature one, consistent with that set forth in the aforementioned references [1] thru [6] below. The water level signal may not only be used for selecting the pressure set point control curves, but may also be used for deriving the adaptive pressure set point as well.

By way of example, and according to some embodiments, the present invention may include, or take the form of, apparatus, such as a pump system, for providing adaptive water level controls for an empty or fill application, featuring a controller or pump controller having a signal processor configured to:

receive signaling containing information about an instant water level $AI_L$ of a liquid in a container and generated by a water level transducer during an empty or fill application; and determine corresponding signaling containing information to control a pump during the empty or fill application based upon the signaling received using a liquid level control algorithm that turns ON the pump when the instant water level $AI_L$ either rises above a maximum empty water level during an empty application, or falls below a maximum fill water level during a fill application, turns OFF the pump when the instant water level $AI_L$ either falls below a minimum empty water level for the empty application, or rises above a second maximum fill water level during the fill application, controls the pump when the instant water level $AI_L$ is either in a liquid level region above the minimum empty water level and below a second maximum empty water level for the empty application, or falls below the second maximum fill water level and above a second minimum fill water level during the fill application, based upon a respective desired adaptive pressure set point SP* being defined from a respective adaptive liquid level control curve with respect to the instant water level $AI_L$.

The apparatus may include one or more of the following features:

The signal processor may be configured to control the pump when the instant water level $AI_L$ is either in a second liquid level region above the second maximum empty water level and below the maximum empty water level for the empty application, or above the maximum fill liquid level and below the second minimum fill water level during the fill application, e.g., based upon the respective adaptive pressure set point SP* being a respective constant pressure set point.

The pump controller may be, or take the form of, an adaptive water level controller.

The apparatus may include the water level transducer configured to sense the instant water level $AI_L$ of the liquid in the container and provide the signaling containing information about the same.

If the pump is turned OFF, then the pump controller may be configured to use the respective constant pressure set point when the pump is initially turned back ON.

A Pump System for Implementing an Empty Application

By way of further example, and according to some embodiments, the present invention may include, or take the form of, a pump system for providing adaptive water level controls for an empty application, featuring a pump controller having a signal processor configured to:

receive signaling containing information about an instant water level $AI_L$ of a liquid in a container and generated by a water level transducer during an empty application; and determine corresponding signaling containing information to control a pump during the empty application based upon the signaling received using a liquid level control algorithm that turns ON the pump when the instant water level $AI_L$ rises above a maximum empty water level, turns OFF the pump when the instant water level $AI_L$ falls below a minimum empty water level, and controls the pump when the instant water level $AI_L$ is in a liquid level region above the minimum empty water level and below a second maximum empty water level, based upon a respective desired adaptive pressure set point SP* being defined from a respective adaptive liquid level control curve with respect to the instant water level $AI_L$.

The pump system for providing the adaptive water level controls for the empty application may also include one or more of the additional features set forth herein.

By way of example, and according to some embodiments, the signal processor may be configured to control the pump when the instant water level $AI_L$ is in a second liquid level region above the second maximum empty water level and below the maximum empty water level, e.g., based upon the respective adaptive pressure set point SP* being a respective constant pressure set point.

A Pump System for Implementing a Fill Application

By way of further example, and according to some embodiments, the present invention may include, or take the form of, a pump system for providing adaptive water level controls for a fill application, featuring:

a pump controller having a signal processor configured to:
receive signaling containing information about an instant water level $AI_L$ of a liquid in a container and generated by a water level transducer during a fill application; and
determine corresponding signaling containing information to control a pump during the fill application based upon the signaling received using a liquid level control algorithm that
  turns ON the pump when the instant water level $AI_L$ falls below a maximum fill water level,
  turns OFF the pump when the instant water level $AI_L$ rises above a second maximum fill water level, and
  controls the pump when the instant water level $AI_L$ falls below the second maximum fill water level and above a second minimum fill water level, based upon a respective desired adaptive pressure set point SP* being defined from a respective adaptive liquid level control curve with respect to the instant water level $AI_L$.

The pump system for providing the adaptive water level controls for the fill application may also include one or more of the additional features set forth herein. By way of example, and according to some embodiments, the signal processor may be configured to control the pump when the instant water level $AI_L$ is above the maximum fill liquid level and below the second minimum fill water level, e.g., based upon the respective adaptive pressure set point SP* being a respective constant pressure set point.

BRIEF DESCRIPTION OF THE DRAWING

The drawing, which is not necessarily drawn to scale, includes the following Figures:

FIG. 5 is a block diagram of apparatus, e.g., such as a pump system having a controller or pump controller with having a signal processor or signal processing module for implementing the signal processing functionality, according to some embodiments of the present invention.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Adaptive Water Level Control

Figure 1:
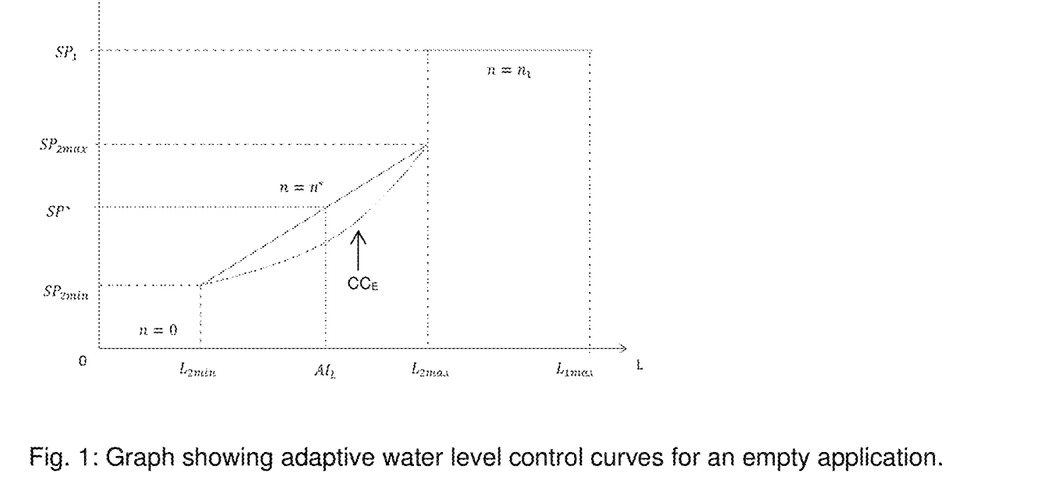
FIG. 1 is a graph of the setpoint (P) versus water level (L) showing adaptive water level control curves for an empty application, according to some embodiments of the present invention.
Figure 2:
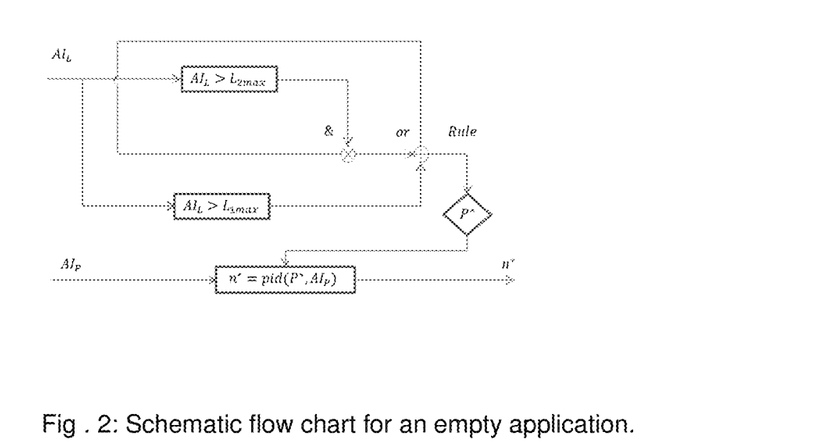
FIG. 2 shows a schematic flow chart for an empty application, according to some embodiments of the present invention.

By way of example, and according to some embodiments of the present invention, an adaptive water level control may be implemented, as follows:

FIGS. 1-2: Water Empty Application

FIG. 1 shows an adaptive water level control for an empty application, where a desired pressure set point of SP* is derived with respect to an instant water level signal of $AI_L$. In this water level control algorithm(s), the water level signal of $AI_L$ from a water level transducer (e.g., like 10d (FIG. 5)) may not only be used for selecting of the pressure set point control curves, but may also be used for deriving the adaptive pressure set point of SP* as well.

Here, by way of example, in FIG. 1 three water level pressure set point curves, e.g., including (1) a constant pressure set point of $SP_1$, (2) an adaptive pressure set point from a water level control curve and (3) a level for sleep, may be selected, based upon the water level signal of $AI_L$.

Consistent with that shown in FIG. 1, when $AI_L > L_{1max}$ for a rising water level, or when $AI_L > L_{2max}$ for a falling water level, the constant pressure set point of $SP_1$ may be selected and used.

Moreover, consistent with that also shown in FIG. 1, when the water level is within the region of $L_{2min} < AI_L < L_{2max}$, however, the pressure set point of SP* may be derived and used from the adaptive water level control curve (e.g., see $CC_E$ (FIG. 1)) with respect to the water level signal of $AI_L$. FIG. 1 shows by way of comparison two control functions in the region of $L_{2min} < AI_L < L_{2max}$, e.g., including a solid line that takes the form of a linear control function, and also including a dashed curve that takes the form of the adaptive water level control curve function, consistent with that disclosed herein.

Moreover still, consistent with that also shown in FIG. 1, for the third water level of a sleeping mode in the pressure set point configuration in the level control algorithm(s) as well, as a final water level switch to stop the pump 10c (FIG. 5) when water level is falling less than a minimum water level, for instance, $AI_L < L_{2min}$, to make the final protection of pump from a drying well. By way of example, the pump may wake up to run when water level is rising up greater than a water level, say, $AI_L > L_{1max}$.

After the pressure set point desired is derived based upon the water level signal, the pump speed of n* may then be obtained from a PID control function with respect to the pressure set point of SP* and the instant pressure signal of $AI_p$ from a pressure transducer (e.g., like 10e (FIG. 5)), e.g., corresponding to n*=n₁ for the constant pressure set point, n*=n* for adaptive pressure set point, and n*=0 for the sleep mode respectively.

By way of example, the pressure set point equations for water empty application in FIG. 1 may be derived as follows:

$$SP^* = \left(\frac{AI_L - L_{2min}}{L_{2max} - L_{2min}}\right)^\alpha (SP_{2max} - SP_{2min}) + SP_{2min}, \quad (1.1)$$

$$L_{2min} \leq AI_L \leq L_{2max}$$

$$SP^* = SP_1 \quad L_{2max} \leq AI_L \leq L_{1max} \quad (1.2)$$

e.g., where α is a control curve shape parameter with $1 \leq \alpha \leq \infty$, which results or causes the control curve shape from a linear function down to a constant of $SP_{2min}$.

Equations (1.1) and (1.2) may be used for deriving a desired pressure set point of SP* for the PID control function of motor speed with respect to an instant pressure of $AI_p$ from the pressure transducer (e.g., like 10d (FIG. 5)). Here, the water level signal of $AI_L$ from a water level transducer (e.g., like 10d (FIG. 5)) may not only be used for selecting of the pressure set point equations from Equations (1.1) or (1.2), but may also be used for deriving the adaptive pressure set point of SP* from Equation (1.1) when water level of $AI_L$ is within the region $L_{2min} \leq AI_L \leq L_{2max}$. There is no need for a pressure set point equation for calculation, since the motor speed is zero on the water level for the sleep mode.

FIG. 2 shows a schematic flow chart of the adaptive water level control for the water empty application. Here, by way of example, two water levels pressure set point algorithms in Equations (1.1) and (1.2), e.g., including a derived pressure set point from the water level control curve or a constant pressure set point, may be selected first according to the Logic "Rule" output, "true" or "false", based upon the water level signal of $AI_L$ from the water level transducer (e.g., like 10d (FIG. 5)). Logic "Rule" output of "true" or "1" is for the constant pressure set point of $SP_1$ when $AI_L > L_{1max}$ for water level rising or $AI_L > L_{2max}$ for water level falling. Logic "Rule" output of "false" or "0" for the pressure set point of SP*, derived from adaptive water level control curve, with respect to the water level signal of $AI_L$ when $L_{2min} < AI_L > L_{2max}$.

After the pressure set point is selected and derived, the pump speed of n* may then obtained from a PID control function with respect to the derived pressure set point of SP* and the instant pressure signal of $AI_p$ from the pressure transducer (e.g., like 10e (FIG. 5)).

When the water level is lower than to a minimum water level, $AI_L < L_{2min}$, the pump may be switched into a sleep mode and is resumed to run when the water level is greater than a maximum water level defined, say, $L_{1max}$.

In most pumping applications, there is already a predefined sleep mode which is to sleep when a minimum pump speed is reached and is to wake up to run when the differential pressure drop defined by the pressure set point and instant pressure signal is reached. One can use this sleeping mode for an underground water application directly as well. Therefore, the logic for the sleep mode is not included in FIG. 2.

Figure 3:
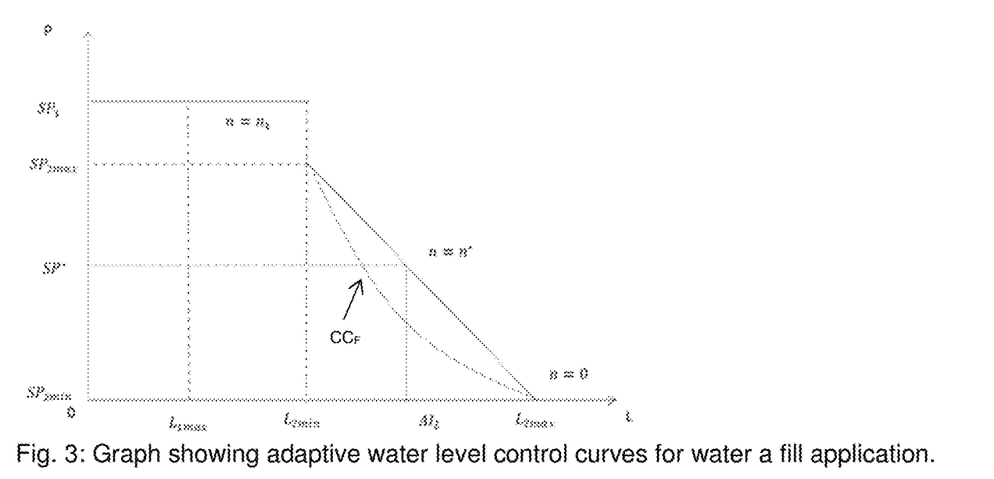
FIG. 3 is a graph of the setpoint (P) versus water level (L) showing adaptive water level control curves for a fill application, according to some embodiments of the present invention.
Figure 4:
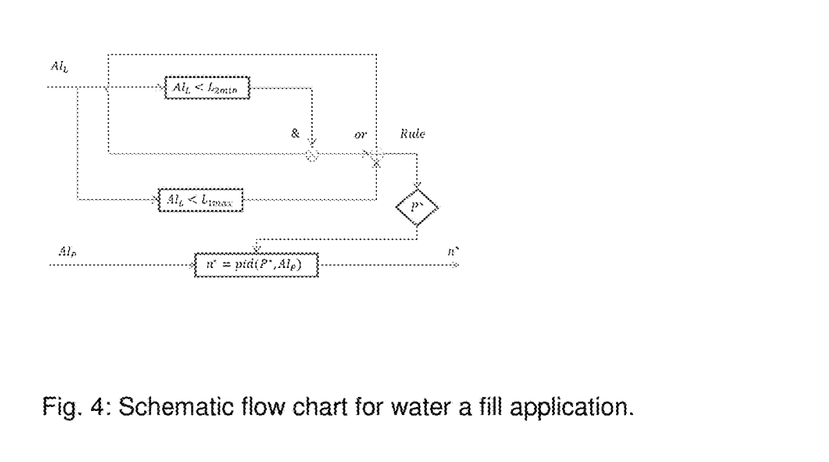
FIG. 4 shows a schematic flow chart for an empty application, according to some embodiments of the present invention.

FIGS. 3-4: Water Fill Application

FIG. 3 shows an adaptive water level control for water fill application, e.g., where a desired pressure set point of SP* is derived with respect to an instant water level signal of $AI_L$. In this water level control algorithm(s), the water level signal of $AI_L$ from a water level transducer (e.g., like 10d (FIG. 5)) may not only be used for selecting of the pressure set point control curves, but may also be used for deriving the adaptive pressure set point of SP* as well.

Here, by way of example, in FIG. 3 three water levels pressure set points curves, e.g., including a constant pressure set point of $SP_1$, an adaptive pressure set point from a water level control curve, and a level for a sleep mode, may be selected, based upon the water level signal of $AI_L$.

Consistent with that shown in FIG. 3, when $AI_L < L_{1max}$ for a falling water level, or when $AI_L < L_{2min}$ for a rising water level, the constant pressure set point of $SP_1$ may be selected and used. When the water level is within the region of $L_{2min} < AI_L < L_{2max}$, however, the pressure set point SP* may be derived and used from the adaptive water level control curve (e.g., see $CC_F$ (FIG. 1)) with respect to the water level signal of $AI_L$. FIG. 3 shows by way of comparison two control functions in the region of $L_{2max} < AI_L < L_{2max}$, e.g., including a solid line that takes the form of a linear control function, and also including a dashed curve that takes the form of the adaptive water level control curve function, consistent with that disclosed herein.

Moreover still, consistent with that shown in FIG. 3, there is a third water level or sleeping mode in the pressure set point configuration in the level control algorithm(s) as well, as a final water level switch to stop the motor/pump. When the water level is greater than a maximum water level, $AI_L > L_{2max}$, the pump may be switched into a sleep mode and is resumed back to run when the water level is less than a minimum water level defined, say, $L_{1max}$.

After the pressure set point desired is derived based upon the water level signal, the pump speed of is then obtained from a PID control function of the pressure set point of SP* and the instant pressure signal of $AI_p$ from a pressure transducer (e.g., like 10e (FIG. 5)), e.g., corresponding to n*=n₁ for the constant pressure set point, n*=n* for adaptive pressure set point, and n*=0 for sleep respectively.

The pressure set point equations for water fill application in FIG. 3 may be derived as follows:

$$SP^* = -\left(\frac{AI_L - L_{2min}}{L_{2max} - L_{2min}}\right)^\alpha (SP_{2max} - SP_{2min}) + SP_{2max}, \quad (2.1)$$

$$L_{2min} \leq AI_L \leq L_{2max}$$

$$SP^* = SP_1 \quad 0 \leq AI_L \leq L_{2min} \quad (2.2)$$

e.g., where a is control curve shape parameter with $1 \leq \alpha \leq \infty$, which results or causes the control curve shape from a linear function down to a constant of $SP_{2min}$.

Equations (2.1) and (2.2) may be used for derive a desired pressure set point of SP* for the PID control function of motor speed with respect to an instant pressure of $AI_p$ from the pressure transducer (e.g., like 10e (FIG. 5)). Here, the water level signal of $AI_L$ from a water level transducer (e.g., like 10d (FIG. 5)) may not only be used for selecting of the pressure set point equations from Equation (2.1) or (2.2), but may also be used for deriving the adaptive pressure set point of SP* from Eq. (2.1) when water level of $AI_L$ is within $L_{2min} \leq AI_L \leq L_{2max}$. There is no need for a pressure set point equation for calculation, since the motor speed is zero on the water level for the sleep mode.

FIG. 4 shows a schematic flow chart of the adaptive water level control for fill application. Here, two water levels pressure set point algorithms in Equations (2.1) and (2.2), e.g., including a derived pressure set point from the water level control curve or a constant pressure set point, may be selected first according to logic "Rule" output, "true" or "false", based upon the water level signal of $AI_L$ from the water level transducer (e.g., like 10d (FIG. 5)). Logic "Rule" output of "true" or "1" is for the pressure set point of SP*, derived from adaptive water level control curve, with respect to the water level signal of $AI_L$ when $L_{2min} < AI_L > L_{2max}$. Logic "Rule" output of "false" or "0" is for the constant pressure set point of $SP_1$ when $AI_L < L_{1max}$ for water level falling or $AI_L < L_{2min}$ for water level rising.

After the pressure set point is selected and derived, the pump speed of n* may then be obtained from a PID control function based upon the derived pressure set point of SP* and the instant pressure signal of $AI_p$ from the pressure transducer (e.g., like 10e (FIG. 5)).

When the water level is greater than a maximum water level, $AI_L > L_{2max}$, the pump is switched into a sleep mode and is resumed to run when the water level is less than a minimum water level defined, say, $L_{1max}$.

In most pumping applications, there is already a predefined sleep mode which is to sleep when a minimum pump speed is reached and to wake up to run when the differential pressure drop defined by the pressure set point and instant pressure signal is reached. One can use this sleeping mode for an underground water application directly as well. Therefore, the logic for sleep mode is not included in FIG. 4.

FIG. 5: Implementation of Signal Processing Functionality

By way of example, FIG. 5 shows apparatus generally indicated as 10, such as a pump system, for providing adaptive water level controls for an empty or fill application, featuring a pump controller C, according to some embodiments of the present invention, e.g., having a signal processor or processing module 10a configured at least to:
  receive signaling containing information about an instant water level $AI_L$ of a liquid in a container and generated by a water level transducer (e.g., like 10d (FIG. 5)) during an empty or fill application; and
  determine corresponding signaling containing information to control a pump (e.g., like 10c (FIG. 5)) during the empty or fill application based upon the signaling received using a liquid level control algorithm that turns ON the pump when the instant water level $AI_L$ either rises above a maximum empty water level during an empty application, or falls below a maximum fill water level during a fill application,
    turns OFF the pump when the instant water level $AI_L$ either falls below a minimum empty water level for the empty application, or rises above a second maximum fill water level during the fill application,
      controls the pump when the instant water level $AI_L$ is either in a liquid level region above the minimum empty water level and below a second maximum empty water level for the empty application, or falls below the second maximum fill water level and above a second minimum fill water level during the fill application based upon a respective desired adaptive pressure set point SP* being defined from a respective adaptive liquid level control curve with respect to the instant water level $AI_L$, and
      controls the pump when the instant water level $AI_L$ is either in a second liquid level region above the second maximum empty water level and below the maximum empty water level for the empty application, or above the maximum fill liquid level and below the second minimum fill water level during the fill application, e.g., based upon the respective adaptive pressure set point SP* being a respective constant pressure set point.

In operation, the signal processor or processing module may be configured to provide the corresponding signaling as control signaling.

By way of example, the functionality of the signal processor or processing module 10a may be implemented using hardware, software, firmware, or a combination thereof. In a typical software implementation, the signal processor 10a would include one or more microprocessor-based architectures, e.g., having at least one signal processor or microprocessor. One skilled in the art would be able to program with suitable program code such a microcontroller-based, or microprocessor-based, implementation to perform the signal processing functionality disclosed herein without undue experimentation. For example, the signal processor 10a may be configured, e.g., by one skilled in the art without undue experimentation, to receive the signaling containing information about an instant water level $AI_L$ of a liquid in a container and generated by a water level transducer (e.g., like 10d (FIG. 5)) during an empty or fill application, consistent with that disclosed herein.

Moreover, the signal processor 10a may also be configured, e.g., by one skilled in the art without undue experimentation, to determine the corresponding signaling containing information to control a pump during the empty or fill application based upon the signaling received using a liquid level control algorithm that
  turns ON the pump when the instant water level $AI_L$ either rises above a maximum empty water level during an empty application, or falls below a maximum fill water level during a fill application,
  turns OFF the pump when the instant water level $AI_L$ either falls below a minimum empty water level for the empty application, or rises above a second maximum fill water level during the fill application,
  controls the pump when the instant water level $AI_L$ is either in a liquid level region above the minimum empty water level and below a second maximum empty water level for the empty application, or falls below the second maximum fill water level and above a second minimum fill water level during the fill application based upon a respective desired adaptive pressure set point SP* being defined from a respective adaptive liquid level control curve with respect to the instant water level $AI_L$, and
  controls the pump when the instant water level $AI_L$ is either in a second liquid level region above the second maximum empty water level and below the maximum empty water level for the empty application, or above the maximum fill liquid level and below the second minimum fill water level during the fill application e.g., based upon the respective adaptive pressure set point SP* being a respective constant pressure set point, e.g., consistent with that disclosed herein.

The scope of the invention is not intended to be limited to any particular implementation using technology either now known or later developed in the future. The scope of the invention is intended to include implementing the functionality of the signal processor(s) 10a as stand-alone processor, signal processor, or signal processor module, as well as separate processor or processor modules, as well as some combination thereof.

By way of example, the apparatus 10 may also include, e.g., other signal processor circuits or components generally indicated 10b, including random access memory or memory module (RAM) and/or read only memory (ROM), input/output devices and control, and data and address buses connecting the same, and/or at least one input processor and at least one output processor, e.g., which would be appreciated by one skilled in the art.

By way of further example, the signal processor 10a may include, or take the form of, some combination of a signal processor and at least one memory including a computer program code, where the signal processor and at least one memory are configured to cause the system to implement the functionality of the present invention, e.g., to respond to signaling received and to determine the corresponding signaling, based upon the signaling received.

Other Embodiments

The pump system is generally understood to include a pump configured to pump a liquid or fluid. The liquid may include, e.g., water. Fluids are understood to include liquids, gases, plasmas, and to some extent plastic solids. While the present invention is described herein in relation to a liquid taking as the form of water, embodiments are envisioned, and the scope of the invention is intended to include, empty and fill applications for fluids too.

In view of this, and by way of still further example, embodiments are envisioned, and the scope of the invention is intended to include, where the present invention takes the form of a pump system for providing adaptive level controls for an empty or fill application for a liquid/fluid, comprising:

a pump controller having a signal processor configured to
receive signaling containing information about an instant liquid/fluid level $AI_L$ of a liquid/fluid in a container and generated by a liquid/fluid level transducer during the empty or fill application; and
determine corresponding signaling containing information to control a pump during the empty or fill application based upon the signaling received using a liquid/fluid level control algorithm that controls the pump when the instant liquid/fluid level $AI_L$ is either in a liquid/fluid level region above a minimum empty liquid/fluid level (e.g., see $L_{2min}$ (FIG. 1)) and below a maximum empty liquid/fluid level (e.g., see $L_{2max}$ (FIG. 1)) for the empty application, or falls below a maximum fill liquid/fluid level (e.g., see $L_{2max}$ (FIG. 3)) and above a minimum fill liquid/fluid level (e.g., see $L_{2min}$ (FIG. 3)) during the fill application, e.g., based upon a respective desired adaptive pressure set point SP* being defined from a respective adaptive liquid/fluid level control curve with respect to the instant liquid/fluid level $AI_L$.

Moreover, this pump system for providing the adaptive water level controls for the empty/fill application may also include one or more of the additional features set forth herein.

Liquid/Fluid Level and Pressure Transducers

Liquid/fluid level and pressure transducers are known in the art, and the scope of the invention is not intended to be limited to any particular type or kind thereof either now known or later developed in the future.

Moreover, techniques are known in the art for arranging and/or implementing liquid/fluid level transducers in relation to containers configured to hold a liquid in order to sense the level of the liquid contained therein, e.g., using the known water level transducers.

Moreover, techniques are known in the art for arranging and/or implementing pressure transducers in relation to a pump configured to pump a liquid in order to sense the pressure of the liquid being pumped, e.g., using the known pressure transducers.

The Maximum/Minimum Liquid Levels

FIGS. 1 and 3 show examples of maximum/minimum liquid levels for the purpose of describing the present invention. The scope of the invention is not intended to be limited to any particular maximum/minimum liquid levels.

REFERENCES

This application forms part of a family of technologies, as follows:

Reference [1]: [911-019-001-2 (F-B&G-1001WO)], by Andrew Cheng, James Gu, entitled "Method and Apparatus for Pump Control Using Varying Equivalent System Characteristic Curve, a/k/a an Adaptive Control Curve," issued as U.S. Pat. No. 8,700,221, on 15 Apr. 2014.

Reference [2]: [911-019-004-3 (F-B&G-X0001WO)], by Andrew Cheng, James Gu, Graham Scott, entitled "DYNAMIC LINEAR CONTROL METHODS AND APPARATUS FOR VARIABLE SPEED PUMP CONTROL," assigned application Ser. No. 13/717,086, filed on 17 Dec. 2012, which claims benefit to provisional application Ser. No. 61/576,737, filed on Dec. 16, 2011.

Reference [3]:[ 911-019-012-2 (F-B&G-X0010US01], by Andrew Cheng, James Gu, Graham Scott, entitled "Sensorless Adaptive Pump Control with Self-Calibration Apparatus for Hydronic Pumping Systems" assigned Ser. No. 14/339, 594, filed 24 Jul. 2014, which also claims benefit to the provisional application Ser. No. 61/858,237, filed on Jul. 25, 2013.

Reference [4]:[ 911-019.015-3 (F-B&G-X0012WO)], by Andrew Cheng, James Gu, Graham Scott, entitled "System and Flow Adaptive Pumping Control Apparatus—A Minimum Pumping Energy Operation Control System vs. Sensorless Application," filed on 4 Jun. 2015, and assigned Ser. No. 14/730,871; which also claims benefit to the provisional application Ser. No. 62/007,474, filed on 4 Jun. 2014.

Reference [5]: [911-019-019-1 (F-B&G-X0016US], by Andrew Cheng, James Gu, entitled "No Flow Detection Means for Sensorless Pumping Control Applications," having Ser. No. 15/044,670, filed on 16 Feb. 2016, which claims benefit to Provisional Patent Application Ser. No. 62/116, 031, filed on 13 Feb. 2015.

Reference [6]:[911-019-022-1 (F-B&G-X0022US], by Andrew Cheng, James Gu, Kyle Schoenheit, entitled "ADVANCED REAL TIME GRAPHIC SENSORLESS ENERGY SAVING PUMP CONTROL SYSTEM," filed on 24 Jul. 2015, and assigned Ser. No. 62/196,355.

All of the aforementioned patents and patent applications are incorporated by reference in their entirety.

This family of technologies relates to adaptive pressure control concepts and techniques using different types and kinds of adaptive control curves, e.g., like that shown in FIGS. 1 and 3 herein.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. Apparatus, including a pump system, for providing adaptive water level controls for an empty or fill application, comprising:
    a pump controller having a signal processor configured to
        receive signaling containing information about an instant water level $AI_L$ of a liquid in a container and generated by a water level transducer during an empty or fill application; and
        determine corresponding signaling containing information to control a pump during the empty or fill application based upon the signaling received using a liquid level control algorithm that
            turns ON the pump when the instant water level AIL either rises above a maximum empty water level during an empty application, or falls below a maximum fill water level during a fill application,
            turns OFF the pump when the instant water level AIL either falls below a minimum empty water level for the empty application, or rises above a second maximum fill water level during the fill application,
            controls the pump when the instant water level AIL is either in a liquid level region above the minimum empty water level and below a second maximum empty water level for the empty application, or falls below the second maximum fill water level and above a second minimum fill water level during the fill application, based upon a respective desired adaptive pressure set point SP* being defined from a respective adaptive liquid level control curve with respect to the instant water level $AI_L$.

2. Apparatus according to claim 1 wherein the signal processor is configured to control the pump when the instant water level $AI_L$ is either in a second liquid level region above the second maximum empty water level and below the maximum empty water level for the empty application, or above the maximum fill liquid level and below the second minimum fill water level during the fill application, based upon the respective adaptive pressure set point SP* being a respective constant pressure set point.

3. Apparatus according to claim 1 wherein the pump controller is an adaptive water level controller.

4. Apparatus according to claim 1 wherein the apparatus comprises the water level transducer configured to sense the instant water level AIL of the liquid in the container and provide the signaling containing information about the same.

5. Apparatus according to claim 1 wherein if the pump is turned OFF, then the pump controller is configured to use the respective constant pressure set point when the pump is initially turned back ON.

6. A pump system for providing adaptive water level controls for an empty application, comprising:
    a pump controller having a signal processor configured to
        receive signaling containing information about an instant water level AIL of a liquid in a container and generated by a water level transducer during an empty application; and
        determine corresponding signaling containing information to control a pump during the empty application based upon the signaling received using a liquid level control algorithm that
            turns ON the pump when the instant water level AIL rises above a maximum empty water level,
            turns OFF the pump when the instant water level $AI_L$ falls below a minimum empty water level, and
            controls the pump when the instant water level $AI_L$ is in a liquid level region above the minimum empty water level and below a second maximum empty water level, based upon a respective desired adaptive pressure set point SP* being defined from a respective adaptive liquid level control curve with respect to the instant water level $AI_L$.

7. A pump system according to claim 6 wherein the signal processor is configured to control the pump when the instant water level $AI_L$ is in a second liquid level region above the second maximum empty water level and below the maximum empty water level, based upon the respective adaptive pressure set point SP* being a respective constant pressure set point.

8. A pump system according to claim 6 wherein the pump controller is an adaptive water level controller.

9. A pump system according to claim 6 wherein the pump system comprises the water level transducer configured to sense the instant water level $AI_L$ of the liquid in the container and provide the signaling containing information about the same.

10. A pump system according to claim 6 wherein if the pump is turned OFF, then the pump controller is configured to use the respective constant pressure set point when the pump is initially turned back ON.

11. A pump system for providing adaptive water level controls for a fill application, comprising:
    a pump controller having a signal processor configured to
        receive signaling containing information about an instant water level AIL of a liquid in a container and generated by a water level transducer during a fill application; and
        determine corresponding signaling containing information to control a pump during the fill application based upon the signaling received using a liquid level control algorithm that
            turns ON the pump when the instant water level $AI_L$ falls below a maximum fill water level,
            turns OFF the pump when the instant water level $AI_L$ rises above a second maximum fill water level, and
            controls the pump when the instant water level $AI_L$ falls below the second maximum fill water level and above a second minimum fill water level, based upon a respective desired adaptive pressure set point SP* being defined from a respective adaptive liquid level control curve with respect to the instant water level $AI_L$.

12. A pump system according to claim 11 wherein the signal processor is configured to control the pump when the instant water level $AI_L$ is above the maximum fill liquid level and below the second minimum fill water level, based upon the respective adaptive pressure set point SP* being a respective constant pressure set point.

13. A pump system according to claim 11 wherein the pump controller is an adaptive water level controller.

14. A pump system according to claim 11 wherein the pump system comprises the water level transducer configured to sense the instant water level $AI_L$ of the liquid in the container and provide the signaling containing information about the same.

15. A pump system according to claim 11 wherein if the pump is turned OFF, then the pump controller is configured to use the respective constant pressure set point when the pump is initially turned back ON.

16. A pump system for providing adaptive liquid/fluid level controls for an empty application and a fill application, comprising:
    a pump controller having a signal processor configured to
        receive signaling containing information about an instant liquid/fluid level $AI_L$ of a liquid/fluid in a container and generated by a liquid/fluid level transducer during an empty application and a fill application; and
        determine corresponding signaling containing information to control a pump during the empty application and the fill application based upon the signaling received using a liquid/fluid level control algorithm that controls the pump when the instant liquid/fluid level AIL is either in a liquid/fluid level region above a minimum empty liquid/fluid level and below a maximum empty liquid/fluid level for the empty application, and falls below a maximum fill liquid/fluid level and above a minimum fill liquid/fluid level during the fill application, based upon a respective desired adaptive pressure set point SP* being defined from a respective adaptive liquid/fluid level control curve with respect to the instant liquid/fluid level $AI_L$.

17. A pump system according to claim 16 wherein the pump controller is an adaptive liquid/fluid level controller.

18. A pump system according to claim 16 wherein the apparatus comprises the liquid/fluid level transducer configured to sense the instant liquid/fluid level $AI_L$ of the liquid/fluid in the container and provide the signaling containing information about the same.

19. A pump system according to claim 16 wherein if the pump is turned OFF, then the pump controller is configured to use the respective constant pressure set point when the pump is initially turned back ON.

20. A pump system according to claim 16 wherein the liquid/fluid includes liquids like water, gases, plasmas, as well as plastic solids.

* * * * *

UNITED STATES PATENT AND TRADEMARK OFFICE
CERTIFICATE OF CORRECTION

PATENT NO. : 10,895,881 B2  
APPLICATION NO. : 15/927296  
DATED : January 19, 2021  
INVENTOR(S) : Andrew A. Cheng et al.

Page 1 of 1

It is certified that error appears in the above-identified patent and that said Letters Patent is hereby corrected as shown below:

In the Claims

Column 11, Lines 32, 36 and 41, Claim 1, Lines 13, 17 and 22, delete "AIL" and replace with --$AI_L$--.

Column 12, Lines 9 and 16, Claim 6, Lines 5 and 12, delete "AIL" and replace with --$AI_L$--.

Column 12, Line 49, Claim 11, Line 5, delete "AIL" and replace with --$AI_L$--.

Column 14, Line 3, Claim 16, Line 14, delete "AIL" and replace with --$AI_L$--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*